Sept. 27, 1966    W. A. GRAFF    3,275,359
GLASS COMPOSITION FOR HERMETIC SEALS
Filed March 14, 1963
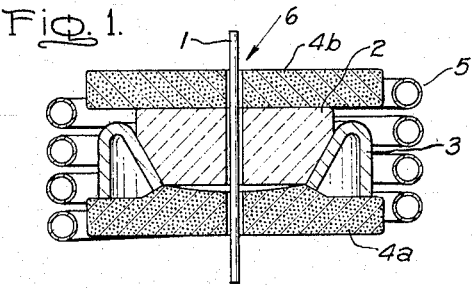
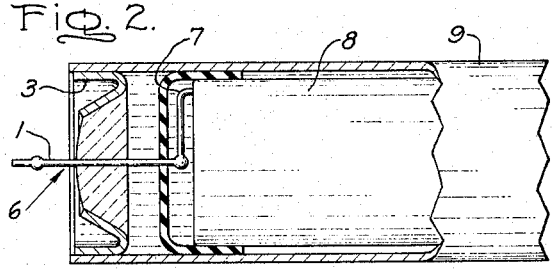
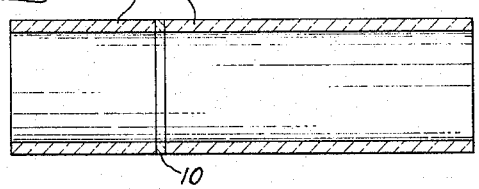
Inventor:
William A. Graff
by Otto Tichy
His Attorney

3,275,359
GLASS COMPOSITION FOR HERMETIC SEALS
William A. Graff, Willoughby, Ohio, assignor to General
Electric Company, a corporation of New York
Filed Mar. 14, 1963, Ser. No. 265,265
7 Claims. (Cl. 287—189.365)

The present invention relates to glass-to-metal and glass-to-ceramic fused hermetic seals and particularly to glass compositions useful in such seals.

In copending application Serial No. 265,235—Shonebarger, of even filing date herewith, which application is assigned to the assignee of the present application, a seal glass useful for sealing to metals and ceramics having a coefficient of expansion which does not differ from that of tantalum by more than $10 \times 10^{-7}$ cm./cm./° C. and seal bodies incorporating the glass and such metals and ceramics are disclosed and claimed.

In copending application Serial No. 265,163—Merritt et al., also of even filing date herewith, which application is assigned to the assignee of the present application, an electrolytic capacitor including seal bodies and sealing glass of copending application Serial No. 265,235—Shonebarger, is disclosed and claimed.

The principal object of the present invention is to provide improved seal glass compositions and glass-to-metal and glass-to-ceramic seal bodies including such glasses. Further objects and advantages of the invention will appear from the following detailed description thereof.

The seal glass disclosed and claimed in application Serial No. 265,235—Shonebarger, is composed of about 35% barium oxide, about 25% aluminum oxide and about 40% boric oxide and has a coefficient of linear thermal expansion of approximately $60 \times 10^{-7}$ cm./cm./° C. and a softening temperature of about 680° C. The glass is eminently satisfactory for sealing to tantalum and has proven useful in the fabrication of electrolytic capacitors having current lead wires of tantalum. While the glass has been successfully used in tantalum seals for electrolytic capacitors and for other electrical devices it has been found that melting of the glass offers difficulty due to the fact that the aluminum oxide is only slowly dissolved in the low melting eutectic of barium oxide and boric oxide. Further, in the completed seal the glass component consisting of the glass of copending application Serial No. 265,235—Shonebarger, which glass component has been formed from the powdered glass, has many small voids, which, while not effecting the impervious nature of the seal to fluids, gives the glass a frosted appearance.

The present invention is based on the discovery that including ceric oxide in the batch for producing the above-described glass shortens the time required to produce the glass from the batch by facilitating the melting together of the batch ingredients, particularly the alumina in the barium oxide-boric oxide mixture. A further advantage which is obtained and which is inexplicable at present is a marked reduction in the number of voids in the glass of the present invention which improves the appearance of seal bodies incorporating the glass.

Briefly stated, the present invention provides a glass suitable for sealing to tantalum and to other metals, alloys and ceramics having similar thermal expansion characteristics, said glass having a composition by weight of about 25% $Al_2O_3$, about 35% BaO, from about 35% to slightly less than 40% $B_2O_3$ and from a small but effective amount to about 5% $CeO_2$. The invention also provides glass-to-metal and glass-to-ceramic seals incorporating the glass compositions. Seals can be made between this glass and other suitable materials for use in electrical devices such as capacitors, in laboratory equipment, and in other applications.

In the drawing accompanying and forming part of this specification, FIG. 1 is a sectional view of parts assembled in a fixture for the making of a glass-to-metal seal of the present invention.

FIG. 2 is a partial sectional view of one end of a tantalum capacitor provided with a glass-to-metal seal of the present invention.

FIG. 3 is a sectional view of a seal between two tubes of ceramic made with a glass of the present invention.

In accordance with the invention a ceric oxide containing glass is produced from a batch having the composition in parts by weight of 45.1 parts $BaCO_3$, 38.3 parts $Al(OH)_3$, 62.2 parts $H_3BO_3$ and 5.0 parts chemically pure grade $CeO_2$. When these proportions are measured in grams, this batch can be melted in 1½ to 2 hours at 1425° C. to produce about 100 grams of glass. The resulting glass composition, as calculated from the batch, is about 35% BaO, 25% $Al_2O_3$, 35% $B_2O_3$ and 5% $CeO_2$. All percentages and proportions in this specification and in the appended claims are by weight unless otherwise indicated. The melting can be done in a platinum crucible by electric heating in a neutral to oxidizing atmosphere. The time necessary for melting is determined by inspection. When all crystals appear to have dissolved and the glass has been mixed to form a clear liquid, the melting is assumed to be complete. The melting time may vary with humidity and other extraneous factors. After founding, the glass is poured on to a relatively cold metal surface for chilling.

In order to form a satisfactory seal with tantalum, the expansion coefficient of the glass should not be appreciably higher than that of tantalum and should not differ from that of tantalum by substantially more than $\pm 10 \times 10^{-7}$ cm./cm./° C., at the annealing temperature of the glass. Similar considerations apply to seals to alumina. Glasses in accordance with the invention will, in general, seal satisfactorily to other metals and alloys and to other ceramics having thermal expansion characteristics similar to that of tantalum.

To form a glass-to-metal seal useful in a capacitor for example, the glass may be crushed and formed into annular pellets by a method described in application Serial No. 265,235—Shonebarger. In brief, this method involves crushing the glass to a powder, mixing the powder with a binder, pressing it to form an annular pellet, heating the pellet to volatilize the binder and then further heating it to sinter the glass particles together.

The glass has a mean thermal expansion coefficient in the temperature range of 0° C. to 300° C. of about $61.7 \times 10^{-7}$ cm./cm./° C., and a softening point of about 685° C.

In forming a glass-to-metal seal, it has been found that this glass will seal around a tantalum wire whether the tantalum metal has been anodically oxidized or has a relatively clean metallic surface. In the latter case, it appears that an adherent tantalum oxide is formed on the metal surface by reaction with the glass at the seal-forming temperature and that this oxide is wet by the molten glass. However, it is preferred to use pre-oxidized tantalum in making a seal.

Other metals in addition to tantalum to which the glass seals successfully include niobium and an alloy of 46% nickel in iron. Niobium has a mean coefficient of thermal expansion of about $73.9 \times 10^{-7}$ cm./cm./° C. in the temperature range of 0° C. to 600° C.; 46% Ni-Fe alloy has a mean coefficient of thermal expansion of about $76 \times 10^{-7}$ cm./cm./° C. in the temperature range of 20° C. to 465° C. A metal or a ceramic to be sealed to the glass should not have a phase change in the temperature range of 20° C. to 500° C. causing a large change in thermal expansion characteristics.

The glass makes a good glass-to-metal seal with metals which have mean coefficients of thermal expansion in the temperature range of 20° C. to 500° C. within about $\pm 10 \times 10^{-7}$ cm./cm./° C. of that of tantalum over the same temperature range which is about $66 \times 10^{-7}$ cm./cm./° C. The temperature range is chosen as being the range between the lowest normal use temperature and the temperature at which the glass sets on cooling. Below 500° C., strains in the glass are relatively permanent; above this temperature, strains can be annealed out and do not greatly affect the strength or reliability of the seal.

Referring now to FIG. 1, satisfactory seals including a tantalum current lead wire 1, an annular glass preform 2, and a titanium header 3 have been made by the following procedure.

The three aforementioned parts are positioned on a graphite pedestal 4a with the tantalum wire 1 extending through the center of the preform 2 and the preform resting concentrically in the titanium header 3. A graphite cap 4b covers the top of the glass. The header and, to a certain extent, the graphite pedestal 4a and cap 4b are heated by a high-frequency electronically powered induction coil 5 in an atmosphere of flowing argon to a temperature of about 950° C. for 30 seconds. The temperature then is raised to 1000° C. for 60 seconds and then to 1075° C. for 90 seconds. The glass-to-metal seal assembly then is cooled to room temperature in a continuing flow of argon gas.

Alternatively, the glass-to-metal seal assembly 6 shown in FIGS. 1 and 2 can be formed by heating the assembly 6 under a vacuum of less than $10^{-4}$ mm. Hg pressure to 650° C. for about fifteen minutes, raising the temperature to 875° C. for 10 minutes in an argon atmosphere at 3 to 5 pounds per square inch pressure above atmospheric, and then cooling in the same atmosphere. The vacuum treatment serves to thoroughly outgas the system before it is raised to sealing temperature.

The glass-to-metal seal assembly described above can be incorporated into an electrical device as shown in FIG. 2 by welding the tantalum wire to a lead strap 7 connected to a tantalum foil capacitor roll 8, sliding the capacitor and the seal assembly 6 into a metal outer sleeve 9, and then circumferentially welding the titanium header 3 to the outer sleeve. A similar seal can be used on the other end of the capacitor. When both headers are welded to the outer sleeve 9, hermetic seals will have been formed.

As will be obvious to those skilled in the art, a similar seal can be used for many types of electrical devices as well as for devices which are not electrical in character.

As pointed out in the book "Glass-to-Metal Seals" by J. H. Partridge, published in 1949 by the Society of Glass Technology, Sheffield, England, most ceramic substances possess nearly uniform thermal expansion characteristics from room temperature up to temperatures exceeding the upper annealing temperatures of glasses. For this reason, the principles applied to matched glass-to-metal seals can often be applied to making of glass-to-ceramic seals. Thus, it is necessary to substantially match the thermal expansion coefficient of the glass with that of the ceramic over the temperature range involved.

The glass of the present invention is useful for sealing together two tubes of polycrystalline sintered alumina as shown in FIG. 3. The alumina is suitably of the type disclosed and claimed in U.S. Patent 3,026,210—Coble, dated March 20, 1962, and assigned to the same assignee as the present application. The alumina tubes are shown at 11, and the glass of the present invention at 10.

Glass-to-ceramic seals can be made in essentially the same manner as the second process used for the tantalum wire-to-glass-to-titanium header seal explained above, although slightly longer times may be necessary to achieve optimum bonding, and indirect rather than induction heating is preferable.

The particular features and principles outlining the invention described in connection with the specific examples will suggest to those skilled in the art various modifications thereof, especially, in the art of making a glass-to-metal or glass-to-ceramic seal and in formulating glass compositions with minor changes in percentages.

What I claim as new and desired to secure by Letters Patent of the United States is:

1. A glass for sealing to tantalum and to other metals, alloys, and ceramics having thermal expansion characteristics such that the mean coefficients of thermal expansion over the temperature range of 20° C. to 500° C. does not differ from that of tantalum over the same temperature range by more than about $10 \times 10^{-7}$ cm./cm./° C., which has a composition by weight of about 25% $Al_2O_3$, about 35% BaO, from about 35% to slightly less than 40% $B_2O_3$ and from a small but effective amount to about 5% $CeO_2$.

2. A vacuum-tight seal between tantalum and glass as set forth in claim 1.

3. A vacuum-tight seal between glass as set forth in claim 1 and a metallic body of thermal expansion characteristics such that the mean coefficient of thermal expansion over the temperature range of 20° C. to 500° C. does not differ from that of tantalum over the same temperature range by more than about $10 \times 10^{-7}$ cm./cm./° C.

4. A vacuum-tight seal between polycrystalline sintered alumina and glass as set forth in claim 1.

5. A vacuum-tight seal between glass as set forth in claim 1 and a ceramic body of thermal expansion characteristics such that the mean coefficient of thermal expansion over the temperature range of 20° C. to 500° C. does not differ from that of tantalum over the same temperature range by more than about $10 \times 10^{-7}$ cm./cm./° C.

6. A glass-to-metal hermetic seal for electrical devices comprising a surface oxidized tantalum current lead wire and a glass body fusion sealed around said wire, said glass being composed by weight of about 25% $Al_2O_3$, about 35% BaO, from about 35% to slightly less than 40% $B_2O_3$, and from a small but effective amount to about 5% $CeO_2$ and having a mean coefficient of thermal expansion of about $61.7 \times 10^{-7}$ cm./cm./° C. in the temperature range of 0° C. to 300° C.

7. A hermetic seal body comprising two sintered alumina ceramic tubes fusion sealed together by glass, said glass being composed of about 35% $B_2O_3$, about 25% $Al_2O_3$, about 35% BaO and about 5% $CeO_2$ by weight and having a mean coefficient of thermal expansion of about $61.7 \times 10^{-7}$ cm./cm./° C. in the temperature range of 0° C. to 300° C.

No references cited.

TOBIAS E. LEVOW, *Primary Examiner.*

H. McCARTHY, *Assistant Examiner.*